(12) United States Patent
Chen et al.

(10) Patent No.: US 6,753,067 B2
(45) Date of Patent: Jun. 22, 2004

(54) MICROCUP COMPOSITIONS HAVING IMPROVED FLEXURE RESISTANCE AND RELEASE PROPERTIES

(75) Inventors: Xianhai Chen, Santa Clara, CA (US); Mary B. Chan-Park, Fremont, CA (US); Xiaojia Wang, Fremont, CA (US); Rong-Chang Liang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 89 days.

(21) Appl. No.: 09/840,756

(22) Filed: Apr. 23, 2001

(65) Prior Publication Data

US 2002/0176963 A1 Nov. 28, 2002

(51) Int. Cl.⁷ .................................................. G09G 3/34
(52) U.S. Cl. ....................... 428/166; 428/156; 428/172; 428/73; 428/72; 428/913; 345/107; 204/606; 359/296
(58) Field of Search .................. 428/156, 166, 428/172, 73, 72, 913; 204/606; 345/107; 359/296

(56) References Cited

U.S. PATENT DOCUMENTS

| | | | |
|---|---|---|---|
| 3,612,758 A | 10/1971 | Evans et al. | 178/5.4 R |
| 3,668,106 A | 6/1972 | Ota | 204/299 |
| 3,697,679 A | 10/1972 | Hathaway | 178/6.6 A |
| 4,071,430 A | 1/1978 | Liebert | 204/299 |
| 4,093,534 A | 6/1978 | Carter et al. | 350/355 |
| 4,285,801 A | 8/1981 | Chiang | 204/299 |
| 4,680,103 A | 7/1987 | Beilin Solomon et al. | 204/299 |
| 4,741,988 A | 5/1988 | Van der Zande et al. | 430/312 |
| 4,995,718 A | 2/1991 | Jachimowicz et al. | 353/31 |
| 5,276,438 A | 1/1994 | DiSanto et al. | 345/107 |
| 5,279,511 A | 1/1994 | DiSanto et al. | 445/24 |
| 5,380,362 A | 1/1995 | Schubert | 106/493 |
| 5,403,518 A | 4/1995 | Schubert | 252/572 |
| 5,573,711 A | 11/1996 | Hou et al. | 252/572 |
| 5,589,100 A | 12/1996 | Grasso et al. | 252/299.01 |
| 5,699,097 A | 12/1997 | Takayama et al. | 347/171 |
| 5,835,174 A | 11/1998 | Clikeman et al. | 349/86 |
| 5,914,806 A | 6/1999 | Gordon, II et al. | 359/296 |
| 5,930,026 A | 7/1999 | Jacobson et al. | |
| 5,961,804 A | 10/1999 | Jacobson et al. | |
| 5,976,405 A | 11/1999 | Clikeman et al. | 252/299.01 |
| 6,017,584 A | 1/2000 | Albert et al. | 427/213.3 |
| 6,037,058 A | 3/2000 | Clikeman et al. | 428/402.2 |

(List continued on next page.)

FOREIGN PATENT DOCUMENTS

| | | | | |
|---|---|---|---|---|
| EP | 1 089 118 A2 | 4/2001 | | G02F/1/167 |
| EP | 1 195 603 A2 | 4/2002 | | |
| JP | 59-171930 | 9/1984 | | G02F/1/19 |
| JP | 02284126 | 11/1990 | | |
| JP | 056653 | 2/2001 | | |
| WO | WO 99/56171 | 11/1999 | | G02F/1/167 |
| WO | WO 00/60410 | 10/2000 | | G02F/1/167 |
| WO | WO 01/67170 A1 | 9/2001 | | |
| WO | WO 01/67170 | 9/2001 | | G02F/1/167 |

OTHER PUBLICATIONS

PCT International Search Report dated Sep. 6, 2002.

Chan–Park, M., et al., "Process for Roll–to–Roll Manufacture of a Display by Synchronized Photolithographic Exposure on a Substrate Web", Ser. No. 09/784,972 —filed Feb. 15, 2001.

Harvey, T.G., "Replication techniques for micro–optics", *SPIE Proc.*—3099:76–82 (1997).

(List continued on next page.)

*Primary Examiner*—William P. Watkins, III
(74) *Attorney, Agent, or Firm*—Heller Ehrman White & McAuliffe LLP

(57) ABSTRACT

This invention relates to a novel composition suitable for use in the manufacture of electrophoretic display cells. The mechanical properties of the cells are significantly improved with this composition in which a rubber material is incorporated.

15 Claims, 3 Drawing Sheets

U.S. PATENT DOCUMENTS

| | | | | |
|---|---|---|---|---|
| 6,067,185 | A | 5/2000 | Albert et al. | 359/296 |
| 6,111,598 | A | 8/2000 | Faris | 348/57 |
| 6,113,810 | A | 9/2000 | Hou et al. | 252/572 |
| 6,120,588 | A | 9/2000 | Jacobson | 106/31.16 |
| 6,120,839 | A | 9/2000 | Comiskey et al. | 427/213.3 |
| 6,172,798 | B1 | 1/2001 | Albert et al. | 359/296 |
| 6,184,856 | B1 | 2/2001 | Gordon, II et al. | 345/107 |
| 6,252,624 | B1 | 6/2001 | Yuasa et al. | 348/56 |
| 6,312,304 | B1 | 11/2001 | Duthaler et al. | 445/24 |
| 6,327,072 | B1 | 12/2001 | Comiskey et al. | 359/296 |
| 6,337,761 | B1 | 1/2002 | Rogers et al. | 359/296 |
| 6,392,786 | B1 | 5/2002 | Albert | 359/296 |
| 2001/0055000 | A1 * | 12/2001 | Kanae et al. | 345/107 |
| 2002/0018043 | A1 | 2/2002 | Nakanishi | |

OTHER PUBLICATIONS

Hopper, M.A., et al., "An Electrophoretic Display, its Properties, Models and Addressing", *IEEE Trans. Electr. Dev.*—26(8):1148–1152 (1979).

Liang, R.C. et al., "An Improved Transmissive or Reflective Liquid Crystal Display and Novel Process for its Manufacture", Ser. No. 09/759,212—filed Jan. 11, 2001.

Liang, R.C., et al., "Manufacturing Process for Electrophoretic Display", Ser. No. 09/606,654—filed Jun. 28, 2000.

Slafer, W.D., et al., "Continuous Manufacturing of Thin Cover Sheet Optical Media", *SPIE Proc.*—1663:324–334 (1992).

Cominsky, B. et al., "An Electrophoretic Ink For All–Printed Reflective Eletronic Displays", Letters To Nature, pp. 253–255 (1998).

Dalisa, A.L., "Electrophorectic Display Technology", *IEEE Transactions of Electron Devices*, Jul. 1997, pp. 827–834.

Drzaic, P., "Liquid Crystal Dispersion", The PDLC Paradigm, (1995), pp. 1–9.

Harbour, J.R. et al, "Subdivided Eletrophoretic Display", Xerox Disclosure Journal, vol. 4, No. 6 (1979).

Lewis, J.C., et al. "Gravitational, Inter–Particle–Electrode Forces in Electrophorectic Display", Proceedings of the S.I.D., vol. 18/3&4 (1977).

Murau, P., et al., "The Understanding and Elimination of Some Suspension Instabilities in an Electrophoretic Display", J. Appl. Phys., 49(9), (1978).

Nakamura, E., et al., "Development of Electrophoretic Display Using Microcapsulated Suspension", SID Digest, (1998), pp. 1014–1017.

Ota, I., et al., "Electrophoretic Image Display EPID Panel", Proceedings of the IEEE, vol. 1, No. 7, July. 1973.

Singer, B. and Dalisa, A.L., "An X–Y Addressable Electrophorectic Display", Proceeding of the S.I.D., vol. 18/3&4, (1977).

USSN 09/518,488, filed Mar. 3, 2000 (to be provided upon request).

* cited by examiner

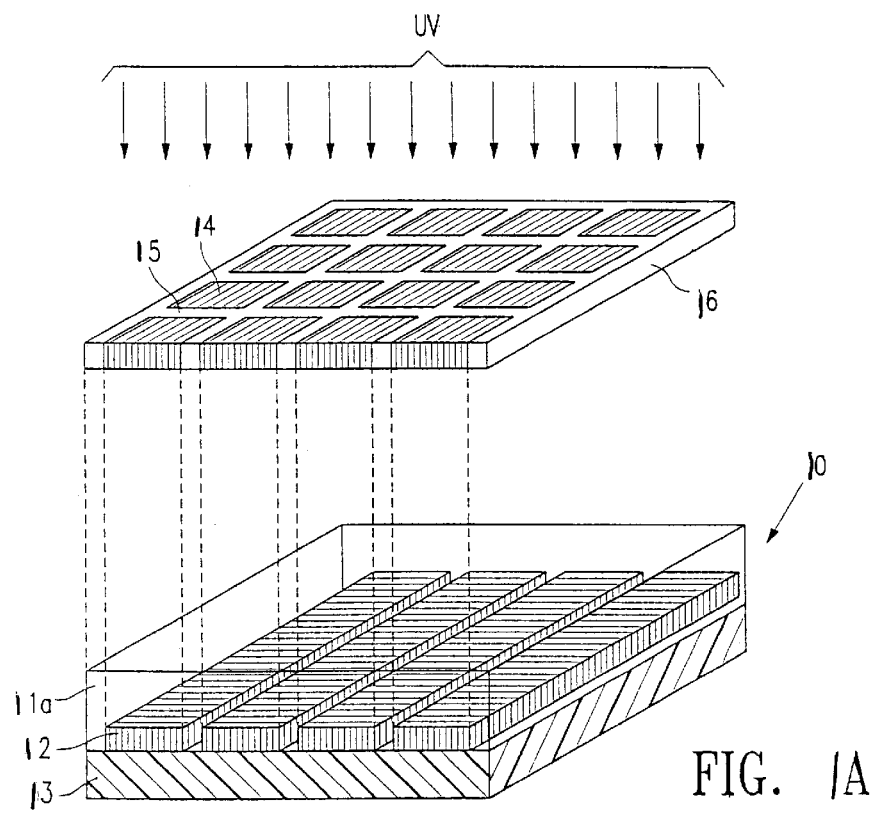
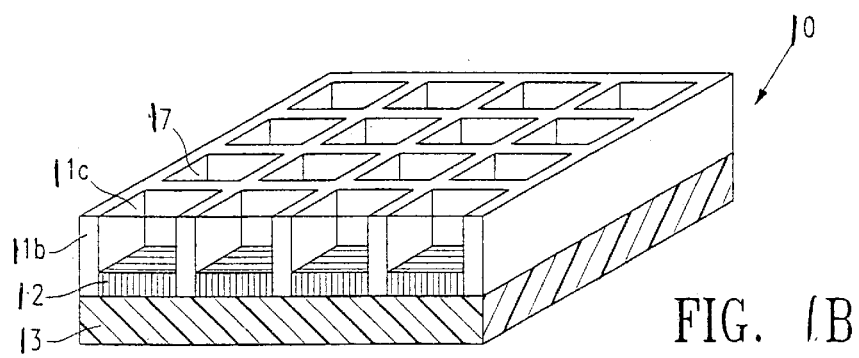
FIG. 1A
FIG. 1B

MICROCUP COMPOSITIONS HAVING IMPROVED FLEXURE RESISTANCE AND RELEASE PROPERTIES

BACKGROUND

The electrophoretic display is a non-emissive device based on the electrophoresis phenomenon influencing charged pigment particles suspended in a solvent. This general type of display was first proposed in 1969. An electrophoretic display typically comprises a pair of opposed, spaced-apart plate-like electrodes, with spacers predetermining a certain distance between the electrodes. One of the electrodes is typically transparent. A dispersion composed of a colored solvent and suspended charged pigment particles is enclosed between the two plates.

When a voltage difference is imposed between the two electrodes, the pigment particles migrate to one side by attraction to the plate of polarity opposite that of the pigment particles. Thus the color showing at the transparent plate may be determined by selectively charging the plates to be either the color of the solvent or the color of the pigment particles. Reversal of plate polarity will cause the particles to migrate back to the opposite plate, thereby reversing the color. Intermediate color density (or shades of grey) due to intermediate pigment density at the transparent plate may be obtained by controlling the plate charge through a range of voltages.

There are several types of electrophoretic displays available in the art, for example, the partition-type electrophoretic display (see M. A Hopper and V. Novotny, IEEE Trans. Electr. Dev., Vol ED 26, No. 8, pp 1148–1152 (1979)) and the microencapsulated electrophoretic display (as described in U.S. Pat. No. 5,961,804 and U.S. Pat. No. 5,930,026). In a partition-type electrophorectic display, there are partitions between the two electrodes for dividing the space into smaller cells in order to prevent undesired movements of the particles such as sedimentation. The microencapsulated electrophoretic display has a substantially two dimensional arrangement of microcapsules each having therein an electrophoretic composition of a dielectric fluid and a dispersion of charged pigment particles that visually contrast with the dielectric solvent.

Furthermore, an improved electrophoretic display (EPD) technology was recently disclosed in the co-pending applications, U.S. Ser. No. 09/518,488, filed on Mar. 3, 2000 pending, U.S. Ser. No. 09/759,212, filed on Jan. 11, 2001 pending, U.S. Ser. No. 09/606,654, filed on Jun. 28, 2000 pending and U.S. Ser. No. 09/784,972, filed on Feb. 25, 2001 pending, all of which are incorporated herein by reference. The improved electrophoretic display comprises cells formed from microcups of well-defined shape, size, and aspect ratio and filled with charged pigment particles dispersed in a dielectric solvent.

SUMMARY OF THE INVENTION

Multifunctional UV curable compositions have been employed to fabricate the microcup array for the improved electrophoretic display. However, the microcup structure formed tends to be quite brittle. The internal stress in the cups due to the high degree of crosslinking and shrinkage often results in undesirable cracking and delamination of the microcups from the conductor substrate during demolding. The microcup array prepared from the multifunctional UV curable compositions also showed a poor flexure resistance.

It has now been found that resistance toward flexure or stress may be significantly reduced if a rubber component is incorporated into the microcup composition. Two other key properties: demoldability during microembossing and adhesion between the sealing layer and the microcups have also been considerably improved with the composition containing this additional rubber component.

Suitable rubber materials for this purpose include SBR (styrene-butadiene rubber), PBR (polybutadiene rubber), NBR (acrylonitrile-butadiene rubber), SBS (styrene-butadiene-styrene block copolymer), SIS (styrene-isoprene-styrene block copolymer), and their derivatives. Particularly useful are functionalized rubbers such as polybutadiene dimethacrylate (CN301 and CN302 from Sartomer, Ricacryl 3100 from Ricon Resins Inc.), graft (meth)acrylated hydrocarbon polymer (Ricacryl 3500 and Ricacryl 3801 from Ricon Resins, Inc.), and methacrylate terminated butadiene-acrylonitrile copolymers (Hycar VTBNX 1300×33, 1300×43 from BF Goodrich).

BRIEF DESCRIPTION OF THE DRAWINGS

FIGS. 1A and 1B show the basic processing steps for preparing the microcups involving imagewise photolithographic exposure through a photomask of conductor film coated with a thermoset precursor ("top exposure").

DETAILED DESCRIPTION OF THE INVENTION

Figure 2B:
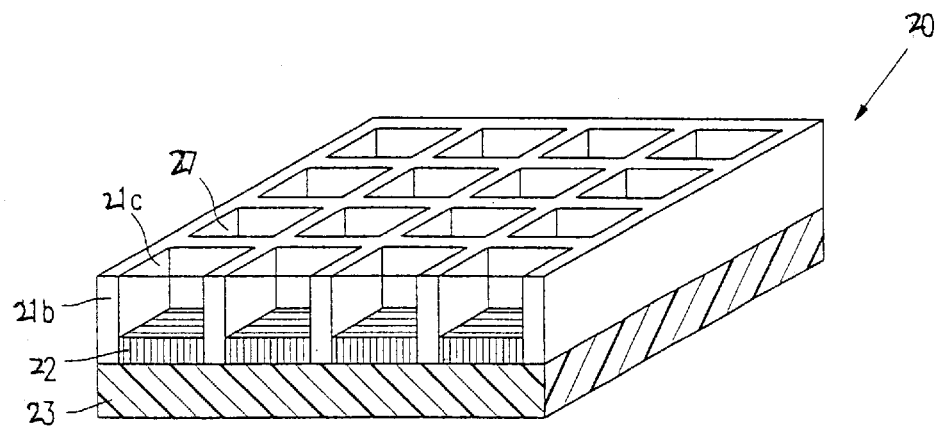
FIGS. 2A and 2B show alternative processing steps for preparing the microcups involving imagewise photolithographic exposure of the base conductor film coated with a thermoset precursor, in which the base conductor pattern on a transparent substrate serves a substitute for a photomask and is opaque to the radiation ("bottom exposure").

Unless defined otherwise in this specification, all technical terms are used herein according to their conventional definitions as they are commonly used and understood by those of ordinary skill in the art. The terms "microcup", "cell", "well-defined", "aspect ratio" and "imagewise exposure" in the context of the present application are as defined in the copending applications identified above, as are the dimensions of the microcups.

The microcups may be prepared by microembossing or by photolithography.

I. Preparation of Microcups by Microembossing

Preparation of the Male Mold

The male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. A master is then ready for electroforming. A typical material used for electroforming is nickel cobalt. Alternatively, the master can be made of nickel by electroforming or electroless nickel deposition as described in "Continuous manufacturing of thin cover sheet optical media", SPIE Proc. Vol. 1663, pp.324 (1992). The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol.3099, pp76–82 (1997). Alternatively, the mold can be made by photomachining, using plastics, ceramics or metals.

The male mold thus prepared typically has protrusions between about 1 to 500 microns, preferably between about 2 to 100 microns, and most preferably about 4 to 50 microns. The male mold may be in the form of a belt, a roller, or a sheet. For continuous manufacturing, the belt type of mold is preferred.

Micro-cup Formation

Micro-cups may be formed either in a batchwise process or in a continuous roll-to-roll process as disclosed in the co-pending application, U.S. Ser. No. 09/784,972, filed on Feb. 25, 2001 pending. The latter offers a continuous, low cost, high throughput manufacturing technology for production of compartments for use in electrophoretic or liquid crystal displays. Prior to applying a UV curable resin composition, the mold may be prepared with a mold release to aid in the demolding process, if desired. The UV curable resin may be degassed prior to dispensing and may optionally contain a solvent. The solvent, if present, readily evaporates. The UV curable resin is dispensed by any appropriate means, such as coating, dipping, pouring and the like, over the male mold. The dispenser may be moving or stationary. A conductor film is overlaid on the UV curable resin. Examples of suitable conductor films include transparent conductor ITO on plastic substrates such as polyethylene terephthalate, polyethylene naphthate, polyaramid, polyimide, polycycloolefin, polysulfone, epoxy and their composites. Pressure may be applied, if necessary, to ensure proper bonding between the resin and the plastic and to control the thickness of the floor of the micro-cups. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin, which should have a good release property from the mold surface.

II. Preparation of Microcup Array by Photolithography

The photolithographic processes for preparation of the microcup array are described in FIGS. 1, 2 and 3.

II(a) Top Exposure

As shown in FIGS. 1A and 1B, the microcup array 10 may be prepared by exposure of a radiation curable material 11a coated by known methods onto a conductor electrode film 12 to UV light (or alternatively other forms of radiation, electron beams and the like) through a mask 16 to form walls 11b corresponding to the image projected through the mask 16. The base conductor film 12 is preferably mounted on a supportive substrate base web 13, which may comprise a plastic material.

In the photomask 16 in FIG. 1A, the dark squares 14 represent the opaque area and the space between the dark squares represents the opening (transparent) area 15 of the mask 16. The UV radiates through the opening area 15 onto the radiation curable material 11a. The exposure is preferably directly onto the radiation curable material 11a, i.e., the UV does not pass through the substrate 13 or base conductor 12 (top exposure). For this reason, neither the substrate 13 nor the conductor 12 needs to be transparent to the UV or other radiation wavelengths employed.

As shown in FIG. 1B, The exposed areas 11b become hardened and the unexposed areas 11c (protected by the opaque area 14 of the mask 16 are then removed by an appropriate solvent or developer to form the microcups 17. The solvent or developer is selected from those commonly used for dissolving or reducing the viscosity of radiation curable materials such as methylethylketone, toluene, acetone, isopropanol or the like.

II(b) Bottom Exposure or Combined Exposure

Two alternative methods for the preparation of the microcup array of the invention by imagewise exposure are illustrated in FIGS. 2A and 2B and 3A and 3B. These methods employ UV exposure through the substrate web, using the conductor pattern as a mask.

Figure 2A:
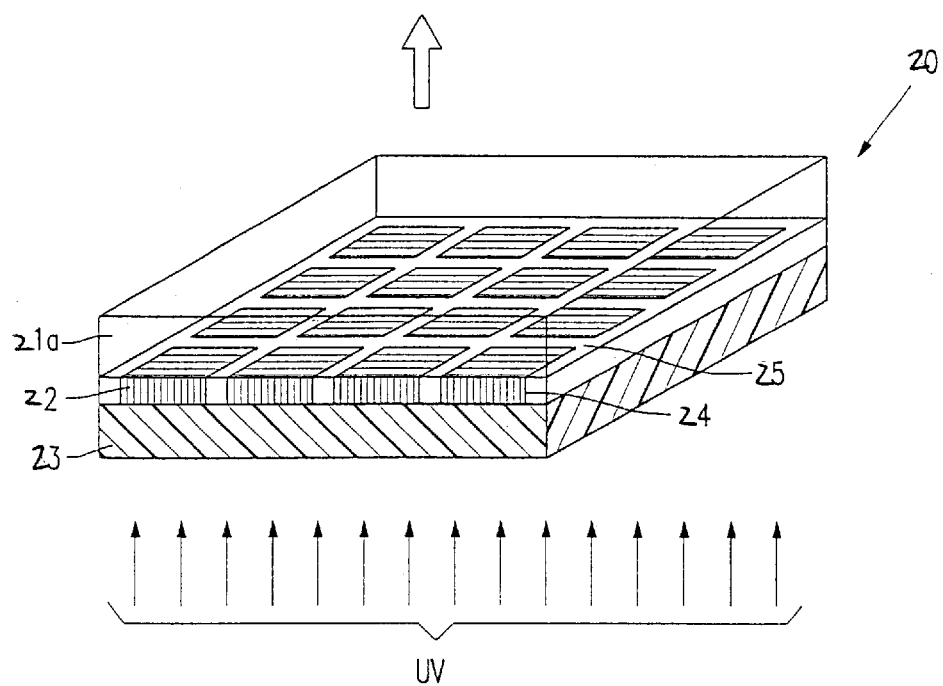

Turning first to FIG. 2A, the conductor film 22 used is pre-patterned to comprise cell base electrode portions 24 corresponding to the floor portions of the microcups 27. The base portions 24 are opaque to the UV wavelength (or other radiation) employed. The spaces 25 between conductor base portions 22 are substantially transparent or transmissive to the UV light. In this case, the conductor pattern serves as a photomask. The radiation curable material 21a is coated upon the substrate 23 and conductor 22 as described in FIG. 2A. The material 21a is exposed by UV light projected "upwards" (through substrate 23) and cured where not shielded by the conductor 22, i.e., in those areas corresponding to the space 25. As shown in FIG. 2B, the uncured material 21c is removed from the unexposed areas as described above, leaving the cured material 21b to form the walls of the microcups 27.

Figure 3B:
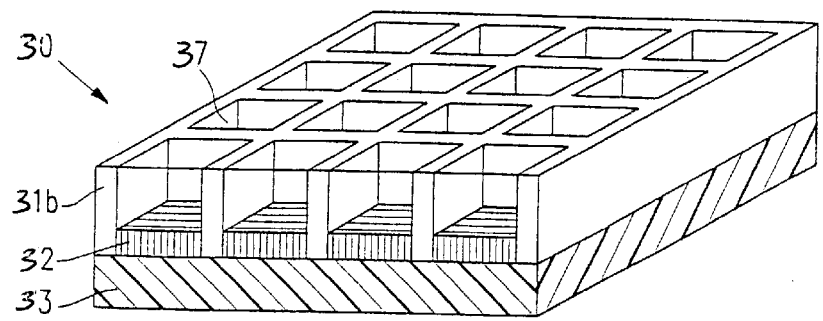
FIGS. 3A and 3B show alternative processing steps for preparing the microcups involving imagewise photolithographic exposure combining the top and bottom exposure principles, whereby the walls are cured in one lateral direction by top photomask exposure and in the perpendicular lateral direction by bottom exposure through the opaque base conductor film ("combined exposure").
Figure 3A:
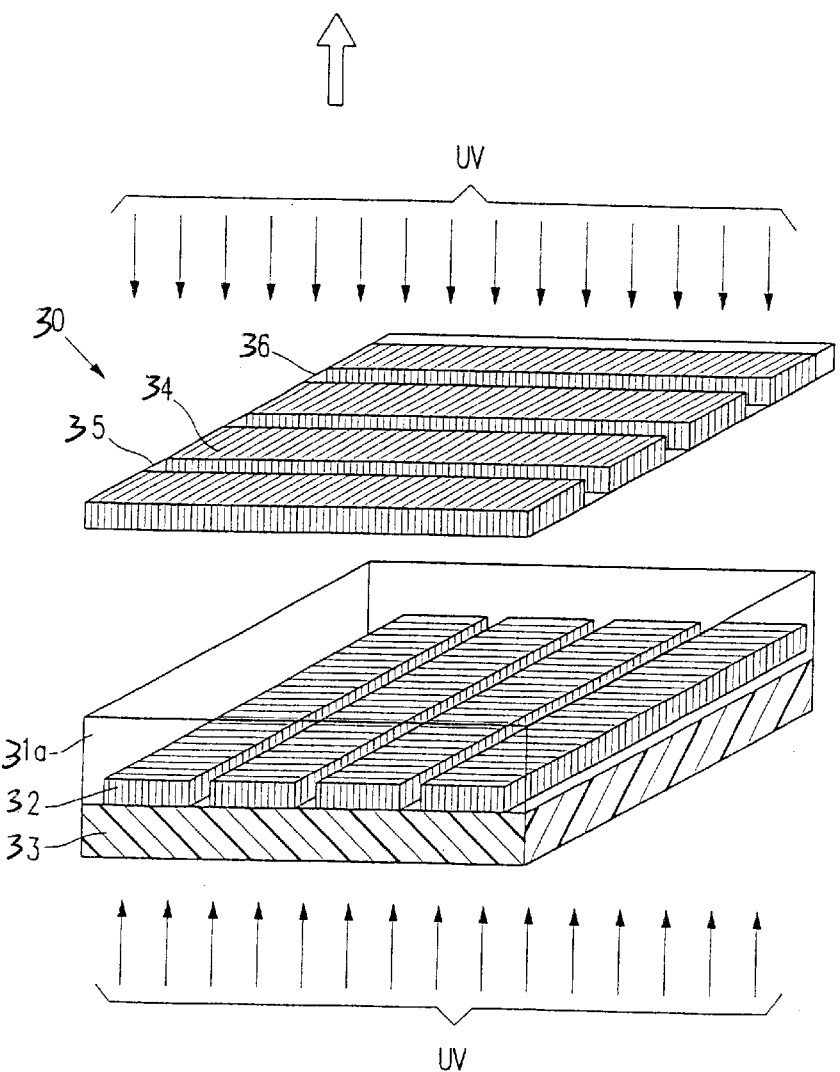

FIG. 3A illustrates a combination method which uses both the top and bottom exposure principals to produce the microcup array 30 of the invention. The base conductor film 32 is also opaque and line-patterned. The radiation curable material 31a, which is coated on the base conductor 32 and substrate 33, is exposed from the bottom through the conductor line pattern 32 which serves as the first photomask. A second exposure is performed from the "top" side through the second photomask 36 having a line pattern perpendicular to the conductor lines 32. The spaces 35 between the lines 34 are substantially transparent or transmissive to the UV light. In this process, the wall material 31b is cured from the bottom up in one lateral orientation, and cured from the top down in the perpendicular direction, joining to form an integral microcup 37.

As shown in FIG. 3B, the unexposed area is then removed by a solvent or developer as described above to reveal the microcups 37.

The radiation curable material used in the processes described above is a thermoplastic or thermoset precursor, such as multifunctional acrylate or methacrylate, vinylether, epoxide and their oligomers, polymers and the like. Multifunctional acrylates and their oligomers are the most preferred. A combination of multifunctional epoxide and multifunctional acrylate is also very useful to achieve desirable physico-mechanical properties.

It has now been found that addition of a rubber component significantly improves the quality of the microcups, such as resistance toward flexure or stress, demoldability during the microembossing step, and adhesion between the sealing layer and the microcups.

Suitable rubber materials have a Tg (glass transition temperature) lower than 0° C. Unsaturated rubber materials are preferred and rubber materials having uncapped or side chain unsaturated groups such as vinyl, acrylate, methacrylate, allyl groups are particularly preferred. More specifically, suitable rubber materials include SBR (styrene-butadiene rubber), PBR (polybutadiene rubber), NBR (acrylonitrile-butadiene rubber), SBS (styrene-butadiene-styrene block copolymer), SIS (styrene-isoprene-styrene block copolymer), and their derivatives. Particularly useful are functionalized rubbers such as polybutadiene dimethacrylate (CN301 and CN302 from Sartomer, Ricacryl 3100 from Ricon Resins Inc.), graft (meth)acrylated hydrocarbon polymer (Ricacryl 3500 and Ricacryl 3801 from Ricon Resins, Inc.), and methacrylate terminated butadiene-acrylonitrile copolymers (Hycar VTBNX 1300×33, 1300× 43 from B F Goodrich).

The percentage of rubber component in the UV curable formulation can be in the range from 1 wt-% to 30 wt-%, preferably from 5 wt-% to 20 wt-%, even more preferably from 8–15 wt-%. The rubber components can be soluble or dispersible in the formulation. Ideally, the rubber component is soluble in the formulation before UV curing and phase separates into microdomains after UV curing.

EXAMPLES

Example 1

Microcup Composition without Rubber 35 parts by weight of Ebercryl® 600 (UCB), 40 parts of SR-399 (Sartomer®), 10 parts of Ebecryl 4827 (UCB), 7parts of Ebecryl 1360 (UCB), 8 parts of HDDA (UCB), and 0.05 parts of Irgacure® 369 (Ciba Specialty Chemicals), 0.01 parts of isopropyl thioxanthone (Aldrich) were mixed homogeneously and used to prepare the microcup array by either the microembossing or photolithographic process.

Example 2–7

Rubber-containing Microcup Compositions

The same procedure as Example 1 was repeated except that 6, 7, 8, 10, 11 or 14 phr (parts per hundred resin) of Hycar® VTBNX 1300×33 were added to the compositions of Examples 2–7, respectively.

Comparison of Flexure Resistance

The microcup compositions of Examples 1–7 were coated onto 2 mil PET film with a targeted dry thickness of about 30 μm, covered by untreated PET, and then cured for 20 seconds under UV light at an intensity of ~5 mW/cm². The coated samples were then 90 degree hand bended to determine the flexure resistance, after the untreated PET was removed. It was found that the flexure resistance of formulations containing more than 8 phr of Hycar VTBNX 1300× 33 (Examples 4, 5, 6, 7) was improved significantly (Table 1).

Comparison of Release Properties Between the Cured Microcup and the Ni—Co Microembossing Male Mold The microcup compositions of the Example 1–7 were coated onto 2 mil PET film with a targeted thickness of about 50 μm, microembossed with a Ni—Co male mold of 60×60× 35 μm with partition lines of 10 μm width, UV cured for 20 seconds, and removed from the mold with a 2" peeling bar at a speed of about 4–5 ft/min. The formulations containing more than 6 phr of rubber (Examples 2–7) showed significantly improved demoldability (Table 1). Little defect or contamination on the mold was observed for formulations containing 10–15 phr of rubber (Examples 5, 6, 7) after at least 100 molding-demolding cycles Comparison of Adhesion Between the Microcup and the Sealing Layers The microcup compositions of Example 1–7 were coated onto 2 mil PET film with a targeted dry thickness of about 30 μm, covered by untreated PET, and then cured for 20 seconds under UV light at an intensity of ~5 mW/cm². The untreated PET cover sheet was removed. A 15 wt % solution of the sealing material (Kraton® FG-1901X from Shell) in 20/80 (v/v) toluene/hexane was then coated onto the cured microcup layer and dried in 60° C. oven for 10 minutes. The thickness of the dried sealing layer was controlled to be about 5 μm. A 3M 3710 Scotch® tape was laminated at room temperature onto the sealing layer by a Eagle® 35 laminator from GBC at the heavy gauge setting. The T-peel adhesion force was then measured by Instron® at 500 mm/min. The adhesion forces listed in Table 1 were the average of at least 5 measurements. It was found that adhesion between the sealing layer and the cured microcup layer was significantly improved by incorporating rubber into the microcup.

TABLE 1

T Peel Adhesion Between the Cured Microcup Material and the Sealing Layer

| Example Number | Hycar VTBNX 1300 × 33 (phr) | Adhesion (peel) to sealing layer (gm/12.5 mm) | Flexure Resistance | Release from the mold |
|---|---|---|---|---|
| 1 | 0 | 431 +/− 33 | poor, bending line broke | fair, some defects |
| 2 | 6 | 513 +/− 12 | fair, bending line broke | Good, no defect after 50 cycles |
| 3 | 7 | — | fair-good, bending line broke | good |
| 4 | 8 | — | Good, bending mark | good-excellent |
| 5 | 10 | 543 +/− 20 | Excellent, no bending mark | Excellent, no defect after 100 cycles |
| 6 | 11 | — | excellent | excellent |
| 7 | 14 | 536 +/− 12 | excellent | excellent |

Example 8

Microcup Composition without Rubber 36 parts by weight of Ebercryl® 830 (UCB), 9 parts of SR-399 (Sartomer®), 1.2 parts of Ebecryl 1360 (UCB), 3 parts of HDDA (UCB), 1.25 parts of Irgacure® 500 (Ciba Specialty Chemicals), and 25 parts of MEK (Aldrich) were mixed homogeneously and used to prepare the microcup array by microembossing as described previously, except that the UV curing time was 1 minute. This example showed some defect on the microcup or contamination on a Ni—Co male mold of 60×60×50 μm with 10 μm partition lines after about 10 molding-demolding cycles.

Example 9

Microcup Composition with Rubber

The same procedure as in Example 8 was repeated except that 5.47 parts of poly(butadiene-co-acrylonitrile) diacrylate (Monomer-Polymer & Dajac Labs, Inc.) was added to the composition. No observable defect on the microcup array or contamination on the Ni—Co male mold was found after about 10 molding-demolding cycles.

Example 10

Pigment Dispersion 6.42 Grams of Ti Pure R706 was dispersed with a homogenizer into a solution containing 1.94 grams of Fluorolink® D from Ausimont, 0.22 grams of Fluorolink® 7004 also from Ausimont, 0.37 grams of a fluorinated copper phthalocyanine dye from 3M, and 52.54 grams of perfluoro solvent HT-200 (Ausimont).

Example 11

Pigment Dispersion

The same as in Example 10, except the Ti Pure R706 and Fluorolink were replaced by polymer coated $TiO_2$ particles PC-9003 from Elimentis (Hihstown, N.J.) and Krytox® (Du Pont) respectively.

Example 12

Microcup Sealing and Electrophoretic Cell

The electrophoretic fluid prepared in Examples 10 was diluted with a volatile perfluoro cosolvent (FC-33 from 3M) and coated onto a microcup array containing 11 phr of Hycar® VTBNX 1300×33 (Example 6) on a ITO/PET conductor film. The volatile cosolvent was allowed to evaporate to expose a partially filled microcup array. A 7.5% solution of polyisoprene in heptane was then overcoated onto the partially filled cups by a Universal Blade Applicator with an opening of 6 mil. The overcoated microcups were then dried at room temperature. A seamless sealing layer of about 5–6 microns thickness with acceptable adhesion was formed on the microcup array. No observable entrapped air bubbles in the sealed microcups were found under microscope. The sealed microcup array was then post treated by UV radiation or thermal baking to further improve the barrier properties. A second ITO/PET conductor precoated with an adhesive layer was laminated onto the sealed microcups. The electrophoretic cell showed satisfactory switching performance with good flexure resistance. No observable weight loss was found after being aged in a 66° C. oven for 5 days.

Example 13

Microcup Sealing and Electrophoretic Cell

The electrophoretic fluid prepared in Example 11 was diluted with a volatile perfluoro cosolvent (FC-33 from 3M) and coated onto a microcup array containing 12 phr of Hycar® VTBNX 1300×33 on a ITO/PET conductor film. The volatile cosolvent was allowed to evaporate to expose a partially filled microcup array. A 7.5% solution of polyisoprene in heptane was then overcoated onto the partially filled cups by a Universal Blade Applicator with an opening of 6 mil. The overcoated microcups were then dried at room temperature. A seamless sealing layer of about 5–6 microns thickness with acceptable adhesion was form on the microcup array. No observable entrapped air bubbles in the sealed microcups were found under microscope. The sealed microcup array was then post treated by UV radiation or thermal baking to further improve the barrier properties. A second ITO/PET conductor precoated with an adhesive layer was laminated onto the sealed microcups. The electrophoretic cell showed satisfactory switching performance with good flexure resistance. No observable weight loss was found after aged in a 66° C. oven for 5 days.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto. For example, it should be noted that the method of the invention for making microcups may also be used for manufacturing microcup arrays for liquid crystal displays. Similarly, the microcup selective filling, sealing and ITO laminating methods of the invention may also be employed in the manufacture of liquid crystal displays.

It is therefore wished that this invention to be defined by the scope of the appended claims as broadly as the prior art will permit, and in view of the specification.

What is claimed is:

1. An electrophoretic display comprising partitioned cells, each of said cells comprising:

a) partition walls formed from a composition comprising a cured radiation curable material with a rubber material dispersed therein;

b) an electrophoretic fluid filled therein; and c) a polymeric sealing layer which is sealingly adhered to said partition walls.

2. The electrophoretic display of claim 1 wherein the radiation curable material is a thermoplastic or thermoset precursor.

3. The electrophoretic display of claim 2 wherein said thermoplastic or thermoset precursor is selected from the group consisting of multifunctional acrylate, acrylate oligomers, acrylate polymers, methacrylate, methacrylate oligomers, methacrylate polymers, vinylether, vinylether polymers, vinylether oligomers, epoxide, epoxide oligomers and epoxide polymers.

4. The electrophoretic display of claim 3 wherein said thermoplastic or thermoset precursor is a multifunctional acrylate or an oligomer thereof.

5. The electrophoretic display of claim 2 wherein said radiation curable material is a combination of multifunctional epoxide and multifunctional acrylate.

6. The electrophoretic display of claim 1 wherein the rubber material has a glass transition temperature lower than about 0° C.

7. The electrophoretic display of claim 6 wherein the rubber material is unsaturated.

8. The electrophoretic display of claim 7 wherein the rubber material has an uncapped or side chain unsaturated groups.

9. The electrophoretic display of claim 1 wherein said rubber material is selected from the group consisting of SBR (styrene-butadiene rubber), PBR (polybutadiene rubber), NBR (acrylonitrile-butadiene rubber), SBS (styrene-butadiene-styrene block copolymer), SIS (styrene-isoprene-styrene block copolymer), and their derivatives.

10. The electrophoretic display of claim 9 wherein said rubber material is polybutadiene dimethacrylate, graft (meth)acrylated hydrocarbon polymer, or a methacrylate terminated butadiene-acrylonitrile copolymers.

11. The electrophoretic display of claim 1 wherein said composition comprises from about 1 to about 30% by weight of the rubber material.

12. The electrophoretic display of claim 11 wherein said composition comprises from about 5 to about 20% by weight of the rubber material.

13. The electrophoretic display of claim 12 wherein said composition comprises from about 8 to about 15% by weight of the rubber material.

14. The electrophoretic display of claim 1 wherein said partitioned cells are microcups.

15. The electrophoretic display of claim 8 wherein said group is vinyl, acrylate, methacrylate or allyl.

* * * * *

UNITED STATES PATENT AND TRADEMARK OFFICE
CERTIFICATE OF CORRECTION

PATENT NO. : 6,753,067 B2
DATED : June 22, 2004
INVENTOR(S) : Xianhai Chen et al.

It is certified that error appears in the above-identified patent and that said Letters Patent is hereby corrected as shown below:

<u>Title page,</u>
Item [*] Notice, change "bydays.days." to -- 89 days --.

<u>Column 2,</u>
Line 29, between "serves" and "a substitute" insert -- as --.

<u>Column 3,</u>
Line 38, change "naphthate" to -- naphthalate --.

<u>Column 4,</u>
Line 11, after "mask 16" add -- ) --.
Line 40, change "principals" to -- principles --.

<u>Column 7,</u>
Line 63, change "form" to -- formed --.

<u>Column 8,</u>
Line 5, before "aged", add -- being --.

<u>Column 9,</u>
Line 4, change "copolymers" to -- copolymer --.

Signed and Sealed this

Twenty-fifth Day of October, 2005

JON W. DUDAS
*Director of the United States Patent and Trademark Office*